(12) United States Patent
Espinosa et al.

(10) Patent No.: US 6,766,449 B2
(45) Date of Patent: Jul. 20, 2004

(54) METHOD AND APPARATUS FOR DYNAMIC PROCESSOR CONFIGURATION BY LIMITING A PROCESSOR ARRAY POINTER

(75) Inventors: Gustavo P. Espinosa, Portland, OR (US); Meera Agrawal, Mountain View, CA (US); Kjeld Svendsen, Santa Clara, CA (US); Bryan C. Tipton, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 09/749,662

(22) Filed: Dec. 28, 2000

(65) Prior Publication Data

US 2002/0087856 A1 Jul. 4, 2002

(51) Int. Cl.[7] .............................. G06F 1/24; G06F 15/76
(52) U.S. Cl. ......................................... 713/100; 712/15
(58) Field of Search ........................... 713/100; 712/13, 712/15

(56) References Cited

U.S. PATENT DOCUMENTS

| | | | | |
|---|---|---|---|---|
| 5,537,656 A | * | 7/1996 | Mozdzen et al. ............ | 713/323 |
| 5,943,242 A | * | 8/1999 | Vorbach et al. ............... | 716/17 |
| 6,205,537 B1 | * | 3/2001 | Albonesi ...................... | 712/43 |

* cited by examiner

Primary Examiner—Thomas Lee
Assistant Examiner—Eric Chang
(74) Attorney, Agent, or Firm—Kenyon & Kenyon (57) ABSTRACT

A method and system provides for changing processor configuration during operation of the processor system. The method and system include a control logic circuit where the control logic circuit sets a control bit to change the size of a processor array that allows disabling (defeaturing) of at least a portion of the array and enabling of a different performance operating mode for the processor system.

21 Claims, 4 Drawing Sheets

METHOD AND APPARATUS FOR DYNAMIC PROCESSOR CONFIGURATION BY LIMITING A PROCESSOR ARRAY POINTER

BACKGROUND OF THE INVENTION

1. Field of the Invention

The present invention relates generally to a processor system. It particularly relates to a method and apparatus for providing a dynamic change of processor configuration during operation of the processor system.

2. Background

A common method for disabling a feature or reducing its role in a microprocessor system is to establish this "defeaturing" configuration during reset of the system, and then starting up the system in that particular setup. However, such a method only allows change of processor configuration during these inactive ("static") periods that require complete system shutdown and then reboot. This limiting methodology, requiring a cold system reboot, therefore suffers a severe performance penalty. Therefore, there is a need to allow change of processor configuration during operation ("mid-stream") without such a performance penalty and without substantially degrading processor operation including limiting any impact to instruction processing by the system. Additionally, change of processor configuration (without requiring a variation in frequency) allows for improved product differentiation in a commercial processor system.

DETAILED DESCRIPTION

In accordance with embodiments of the present invention, change of processor system configuration during operation of the processor is enabled by changing the size of an array of the processor. Changing the array size, which may be a change from a larger size to a lower size for an internal processor array, effectively disables one or more features (defeatures) of the processor system and may be achieved using one of a multiple number of methods. Change of array size is achieved by not allowing an array pointer to access upper-array entries that are defeatured.

Figure 1:
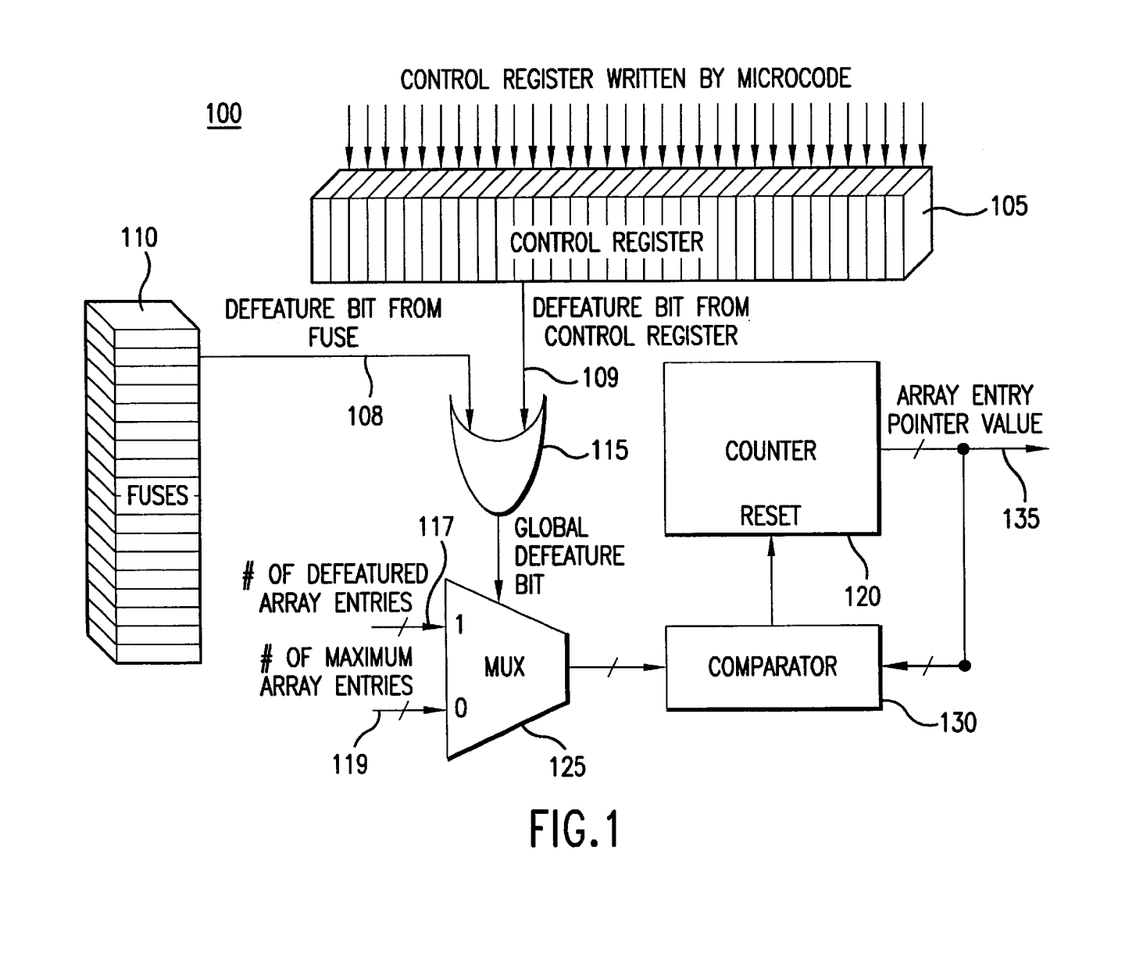
FIG. 1 shows an exemplary processor architecture in accordance with embodiments of the present invention.

FIG. 1 shows an exemplary processor architecture 100 for changing the processor configuration in accordance with embodiments of the present invention. The processor architecture 100 includes control logic circuit components including a control register 105, fuse 110, both intercoupled to logic 115 (e.g., OR function), and includes multiplexer 125 intercoupled to logic 115, comparator 130 intercoupled to multiplexer 125, and counter 120 intercoupled to comparator 130.

One method for reducing the size of the array uses a control register 105. This method effectively changes the processor array size during operation (in "mid-stream") of the processor system 100 in the course of instruction fetching and execution. Advantageously, software code (a software patch) may be written to the control register 105, during operation of the processor 100, to set defeature bit 109 from the control register 105 to "1". Defeature bit 109 from control register 105 is input to logic 115 (preferably an OR logic function) along with a fuse defeature 108 from fuses 110. Regardless of the value of the fuse bit 108, if the control register defeature bit 109 is set to a value of "1", then the logic 115 outputs a control bit ("global defeature bit") 116 with a value of "1". The control bit 116 is fed to the multiplexer 125 and enables the multiplexer 125 to output one of its two inputs, the number of entries of a lower valued array (number of defeatured entries) 117 rather than the number of maximum array entries 119 since the control bit 116 is set to "1".

With a value of "1" for the control bit 116 being fed to the multiplexer 125, the multiplexer 125 outputs the number of defeatured entries 117 that is input to the comparator 130. The counter 120, intercoupled to the comparator 130, keeps a running count of the numbered position where an array entry is to be made (written) that is output as an array entry pointer value 135. The counter 120 is moving a pointer along to a numbered array entry point for data input into that numbered position of the array. Once the pointer has moved to all enabled numbered positions of the array, which may be from lower-array entries to upper-array entries, it must wrap-around to start the pointer back at the beginning of the array (lower-entries). To initiate this wrap-around, the comparator 130 compares the value of the highest number of enabled numbered positions (number of defeatured array entries 117 for this scenario) with the current pointer value 135 output from the running counter 120. When the current array entry pointer value 135 (indicating the numbered position where an entry is to be made) equals the number of number of defeatured array entries 117 (for this exemplary scenario), the counter 120 is reset by an output from comparator 130 and outputs an array entry pointer value 135 that points to the beginning of the array. For an exemplary embodiment, the number of defeatured array entries 117 may be 16 where the counter 120 performs a running count from "0" to "15". When reaching the end of the enabled array entries, the counter 120 outputs an array entry pointer value of "15" indicating that 16 numbered positions in the array have been pointed to (when counting and numbering from "0") and that number (of numbered positions in the array) is equal to the number of defeatured array entries 117 ("16"), enabled by the global defeature bit 116, when compared by the comparator 130. At this point, a wrap-around is necessary to begin array pointing back at the beginning of the array and therefore the counter is reset to "0". Assuming the number of maximum array entries is "24", the upper-array entries (16–23) have been effectively "defeatured" using the global defeature bit 116.

It is noted that the logic design for microprocessor system 100 is solely exemplary as enabling of the defeaturing procedure may be initiated using different bit values for defeature bits 108, 109, 116 (e.g., "0" instead of "1") using a different logic design (e.g., "NAND" gate instead of "OR" gate to perform the "OR" function). Additionally, it is noted that setting the number of defeatured array entries 117 to "16", the number of maximum array entries 119 to "24", and using an array arranged from "0" to "15" numbered positions is solely exemplary and any number may be chosen as the number of defeatured array entries 117, number of maximum array entries, or numbered positions in the array.

For the alternative scenario when the defeature bit 109 from control register 105 is set to "0", and assuming the fuse defeature bit 108 is set to "0", the logic 115 outputs a global defeature bit 116 of value "0" that sets the multiplexer 125 output to the number of maximum array entries 119 (e.g., 24). The maximum number of array entries 119 is then used by the counter and comparator to keep track of when wrap-around should be initiated after the enabled number of array entries (the maximum number of array entries 119 in this scenario) becomes equal to the array entry pointer value 135 output by the counter 120. In this scenario, wrap-around is not initiated (and the counter reset) until the array entry pointer points to the $23^{rd}$ array position (assuming a count from 0 to 23) so that the maximum number of array entries (24) is equal to number of array positions (24) pointed to by the array entry pointer. The upper-array entries (16–23) are not "defeatured" and therefore accessible to the array pointers.

In accordance with embodiments of the present invention, in processor architecture 100, an alternative method for setting the global defeature bit 116 uses fuse 110. Advantageously, fuse 110 sets the fuse defeature bit 108 to a value of "1" and can be set during manufacturing of the processor system 100. The fuse defeature bit 108 is then input to logic 115 that outputs the global defeature bit 116 with a value of "1" to commence the previously-described steps of reducing the array size and effectively "defeaturing" the upper-array entries using multiplexer 125, comparator 130, and counter 120. When the fuse defeature bit 108 is set to "0" (assuming the control register defeature bit 109 is also set to "0"), the logic 115 will output the global defeature bit 116 with a value of "0" to effectively enable the upper-array entries as previously-described that allows the array pointer access to these entries using the other components of processor architecture 100. Advantageously, the fuse defeature bit 108 may be set during manufacturing of the processor system 100 and may activate defeaturing during initial operation of the processor system 100. As described in further detail herein, defeaturing of the processor array advantageously creates a different performance operating mode for the processor system 100.

Figure 2:
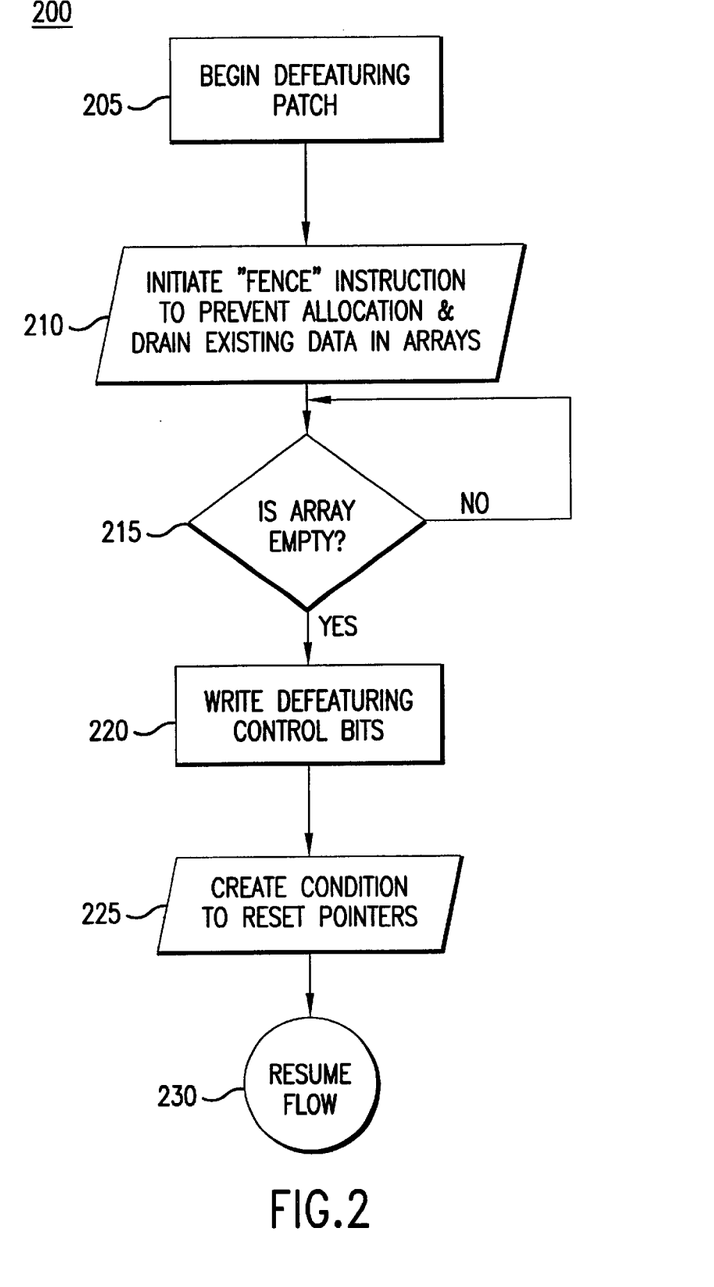
FIG. 2 shows an exemplary flow diagram of the methodology used in accordance with embodiments of the present invention.

In accordance with embodiments of the present invention, to efficiently reduce the processor array size for the software patch method, steps need to be performed in preparation for reducing the array size to ensure that the upper-array entries to be disabled ("defeatured") do not contain any valid data. FIG. 2 shows an exemplary flow diagram 200 for the control methodology followed by the sofware patch method to reduce processor array size and ensure empty array entries to be disabled. At step 205, the software patch is called (temporarily halting existing processor program execution) and executed to initiate and control defeaturing. At step 210, a filtering (fence) instruction is initiated where any existing data in the array is emptied (retired) and any further data is prevented from being placed into the array. At step 215, a query is performed to determine if the emptying procedure has been completed to ensure that the array to be defeatured has been drained of data. A "no" answer repeats the query until the emptying and prevention step is fully completed. At step 220, after the process flow continues with a "yes" answer, the control register 105 is written with the software code to set the control register defeature bit 109 to "1" resulting in the global defeature bit 116 being enabled. At step 225, the array pointers are reset to a pre-determined value (e.g., "0") using the counter 120 to begin the running count of the array entry to be made (written). At step 230, the existing processor instruction flow is resumed with the defeatured array size.

Figure 3:
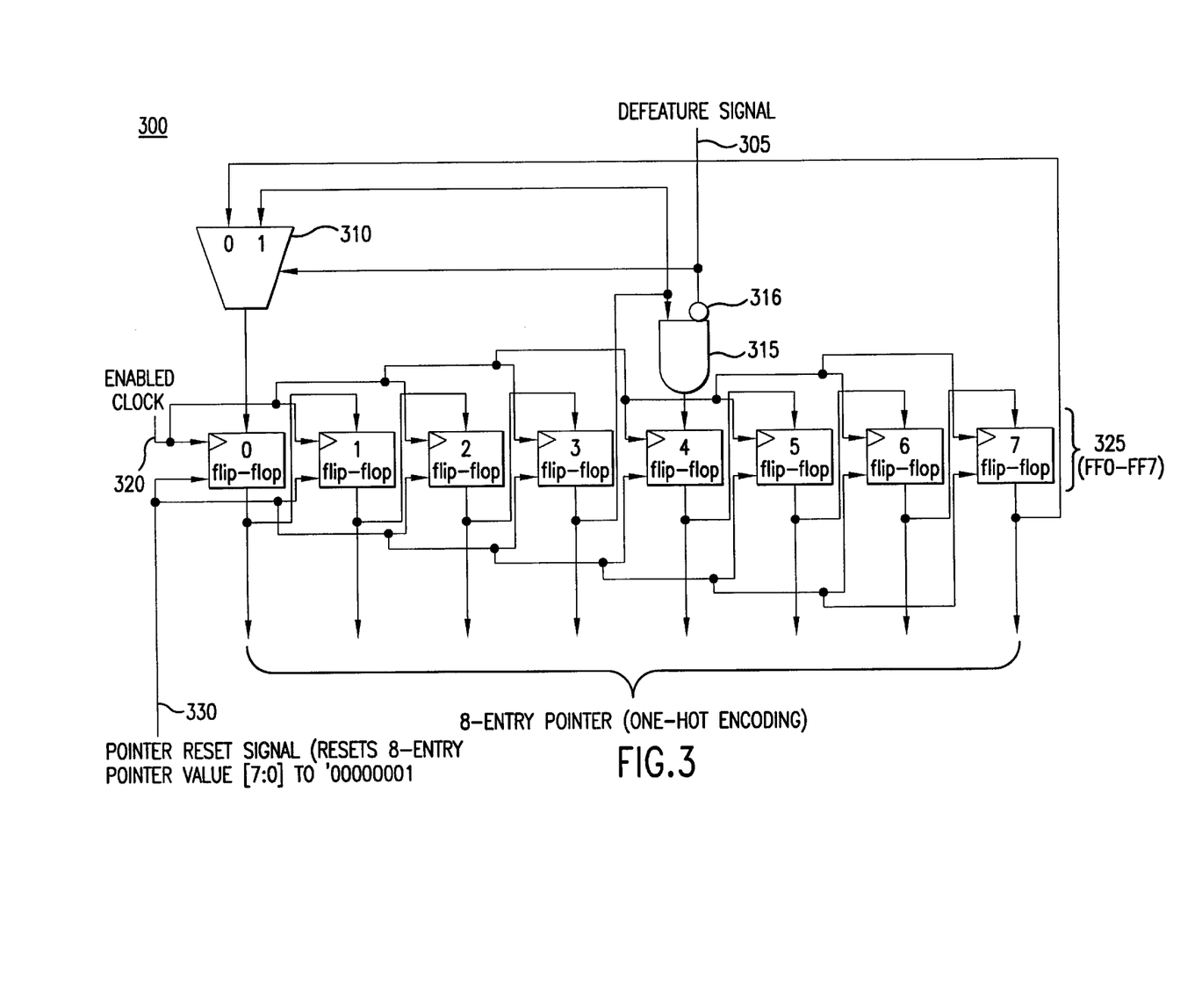
FIG. 3 shows an exemplary logic architecture in accordance with embodiments of the present invention.

In accordance with embodiments of the present invention, FIG. 3 shows an exemplary logic architecture 300 for supporting "defeaturing". The logic architecture 300 can be used to point to an array entry to allocate. The intercoupled logic architecture includes multiplexer 310, logic 315 (e.g., AND and inverter functions), and row of flip-flops 325 (FF0–FF7). All flip-flops 325 receive clock signal 320 and pointer reset signal 330 during operation of the array entry allocation. The allocation is sequential (e.g., 00000001, 00000010, 00000100, etc.) along the flip-flops 325 (FF0, FF1, . . . ) as a flip-flop's output is tied to the subsequent flip-flop's input so that the last output for the previous flip-flop becomes the output for the current flip-flop as selected for array entry. One entry is selected per clock cycle, and wrap around occurs from FF7 to FF0 assuming the maximum number of array entries is enabled. The outputs from the flip-flops 325 (FF0–FF7) correspond to bit positions (bit[0]–bit[7] with bit[0] the least significant bit) to indicate a pointer value (e.g., 0010000). Advantageously, the logic architecture 300 uses one-hot encoding where only one output (bit) from any of the flip-flops 325 is high at a time while all the other flip-flops are low (e.g., '0010000 indicating that array entry allocation is for numbered array entry "5").

During operation, defeature signal 305 is input to logic 315 where a value of "0" enables the upper flip-flops (FF4–FF7) for array entry allocation and alternatively, a value of "1" disables the upper flip-flops for array entry allocation during "defeaturing". When the defeature signal is "1", then the output from logic 315 is always "0" since the defeature signal is input to an inverter 316 resulting in an input of continually "0" to the AND gate portion of logic 315 when defeaturing is enabled. During defeaturing, since a "0" is always input to FF4, then the output of FF4 is always "0" which effectively disables this flip-flop and all subsequent flip-flops (since flip-flop output tied to subsequent flip-flop's input for all flip-flops) using a one-hot encoding scheme (must have a high output of "1" to be selected).

For this example, the maximum number of array entries is 8 (FF0–FF7 enabled) and the number of defeatured array entries is 4 (FF4–FF7 disabled). When the defeature signal is "1", defeaturing is enabled and a portion of flip-flops 325 (FF4–FF7) are disabled using logic 315. FF4 is not able to accept input from FF3 as logic 315 disables entry of any input from FF3 due to a continual output of "0" from the AND gate portion of logic 315 which continually de-selects FF4 and subsequent intercoupled flip-flops FF5–FF7. Wrap-around will occur from FF3 to FF0 as the defeature signal (with a value of "1") enables register 310 to accept pointer input from FF3. Alternatively, when defeature signal 305 is low (e.g., value of "0"), then defeaturing is disabled, FF4–FF7 are enabled, and wrap-around occurs from FF7 to FF0 as the low defeature signal (e.g., "0") allows register 310 to accept pointer input from FF7.

To reset the flip-flops 325 and start array entry allocation again at FF0, the pointer reset signal 330 is asserted (e.g., value of "1"). When asserted, the pointer reset signal 330 resets the 8-entry pointer value to "00000001" as FF0 is made active with a high output (e.g., value of "1") and FF1–FF7 are de-selected with a low output (e.g., value of "0") using the one-hot encoding scheme.

It is noted that the particular logic function, array entry numbering, and number of maximum and defeatured array entries chosen for FIG. 3 was solely exemplary and alternative logic functions, number of maximum and defeatured array entries, and array entry numbering may be chosen.

Figure 4:
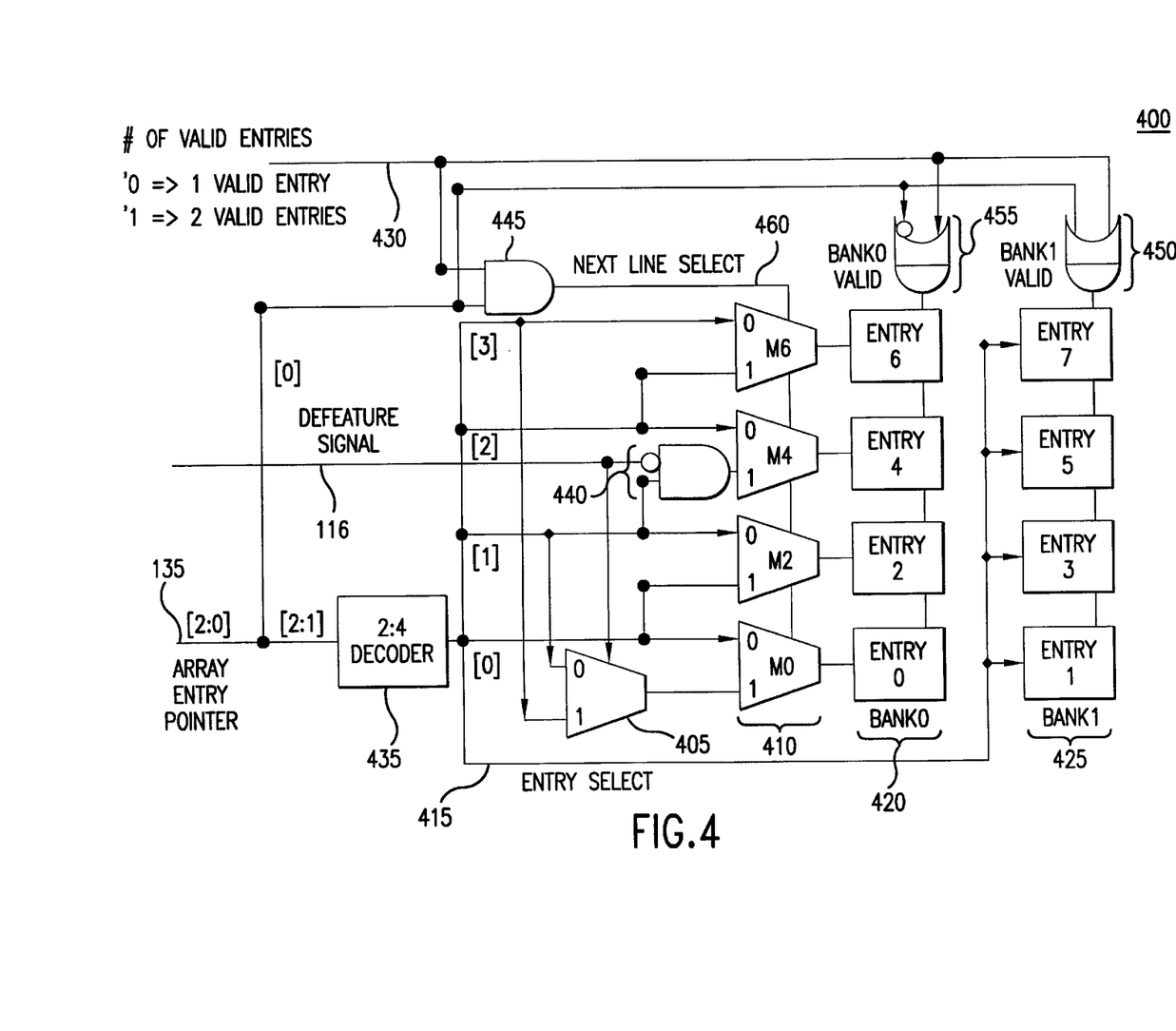
FIG. 4 shows an exemplary processor array architecture in accordance with embodiments of the present invention.

In accordance with embodiments of the present invention, FIG. 4 shows an exemplary processor array architecture that may be used to support "defeaturing". The intercoupled processor array architecture includes decoder 435, multiplexer 405, row of multiplexers 410 (M0, M2, M4, M6) intercoupled to multiplexer 405 and decoder 435, and array banks 420, 425 (bank0, bank1, entries 0–7) intercoupled to row of multiplexers 410. The array architecture 400 further includes defeature logic 440 intercoupled to M4 and multiplexer 405, next line select logic 445 intercoupled to row of multiplexers 410, and valid entry logic 450, 455 intercoupled to array banks 420, 425. Array banks 420, 425 may be any useful processor array that would benefit from defeaturing (e.g., disabling of upper portions of array) including, but not limited to memory arrays, arrays storing outstanding requests, arrays storing results of executed instructions, and other arrays.

The array entry pointer value 135 and defeature signal 116 can come from counter 120 output in processor architecture 100 as shown in FIG. 1. For this example, the pointer value 135 is three bits (e.g., "001") and indicates the base (lowest numbered) array entry that will be allocated. Array entry is sequential by line (e.g., line 0 corresponding to array entries 0 and 1) as the "0" input port for each multiplexer is coupled to the subsequent mulitplexer's "1" input port for the row of multiplexers 410 which also allows for two entries to be allocated at a time (counter 120 will increment by 2 if two entries are made) even across array lines (e.g., from line 0 to line1). If two entries are allocated, the pointer value 135 will still point to the base entry while valid entry logic 450 and next line select logic 445 will be used to select the second sequential entry if the next sequential entry is in a subsequent array line.

During operation, defeature signal 116 is input to defeature logic 440 and multiplexer 405 indicating whether defeaturing is enabled or disabled, and whether wraparound will occur from maximum number of array entries (e.g., 8) to lowest numbered array position (e.g, 0), or from number of defeatured array entries (e.g., 4) to lowest numbered array position (e.g., 0). If defeature signal 116 is high (e.g., value of "1"), then upper array entries 4–7 are disabled in array banks 420, 425 using defeature logic 440 since the pointer value 135 is blocked from array entry 4 (and M4) and any subsequent array entry positions (or multiplexers). Wraparound will occur from entry 3 back to entry 0 since these upper array entries (4–7) are blocked and reset of counter 120 will occur when the number of defeatured entries 117 (e.g., 4) equals the last array entry allocation using comparator 130. Alternatively, if defeature signal 116 is low (e.g., value of "0"), then upper array entries 4–7 are enabled in array banks 420, 425 using defeature logic 440 since the pointer value 135 can now pass through to M4 and array entry 4 and subsequent array entries and multiplexers.

For an exemplary scenario in accordance with embodiments of the present invention, with defeaturing disabled, one array entry allocation is to be made starting with entry 0 in bank 420 (bank0). The array entry pointer 135 (output from counter 120) will equal "000". The least significant bit, bit[0], is equal to "0" and indicates the base (initial) entry that will be allocated which is entry 0. The other two bits, bit[1] and bit [2], are "00" which equals "0" as a numerical equivalent. These two bits indicate the line (entry select 415) of the array banks 420, 425 entry allocation is to be made. With a numerical equivalent of "0", line 0 is selected corresponding to the line with entries 0 and 1. Line 1 corresponds to the line with entries 2 and 3, and so on sequentially until the top of the array banks 420, 425 are reached. Bit[1] and bit[2] are a two-bit input to decoder 435 that generates four (e.g. 1 bit) outputs indicating the line selected for entry (e.g., line 0) which is sent to each multiplexer M0–M6 in row 410.

Since only a single array entry is to be made, the number of valid entries signal 430 is not asserted (e.g., set to "0") which only enables bank 420 (bank0) for entry allocation due to valid entry logic 450, 455. The inputs to valid entry logic 450, 455 (e.g., OR gate) are the number of valid entries signal 430 (set to "0" for one valid entry) and bit[0] of the array entry pointer 135. Bit[0], using logic 450, 455, indicates the bank where initial entry is to be made where a value of "0" selects bank 420 (bank0) and a value of "1" selects bank 425 (bank1). In this example, bit[0] is equal to "0" (for pointer value of "000") which enables bank 420 (bank0) for array entry since the output from logic 450 for bank0 is "1" due to an inverter gate preceding logic 450 for the bit[0] input. Bank 425 (bank1) is disabled since both inputs to logic 455 for bank1 are "0" resulting in a "0" output for bank 425 (bank1). With bank 420 (bank0) enabled, entry allocation can be made for entry 0.

The next line select signal 460, intercoupled to all multiplexers M0–M6, enables the next array line (e.g., line 1, line 2, line 3) to be selected for array entry allocation. For this example, since only a single array allocation was made (for entry 0), the next array entry allocation would be for entry 1. Correspondingly, the next line select signal 460 is not asserted which keeps array entry on line 0 for entry 1. The inputs to next line select logic 445 are the number of valid entries signal 430 and bit[0] from array entry pointer 135. For this example, the number of valid entries signal 430 is set to "0" (only 1 valid entry) and bit[0] equal "0" which leads to an output of "0" for the next line select signal 460 which maintains array entry allocation at the current line (line 0).

Also, for this example, defeature signal 116 is not enabled and thus provides an input of "0" to defeature logic 440 that is inverted to a "1", by the inverter gate portion of logic 440, allowing multiplexer M4 to be enabled for entry allocation to entry 4 (and subsequent entries) when the next line select signal 460 is enabled. Using logic 445, 450, 455, and decoder 435 subsequent single entries will be allocated for entries 1–7 made one at a time as counter 120 outputs an increasing array entry pointer 135. With defeaturing disabled, wrap-around will occur from entry 7 to entry 0 as the counter 120 is reset from the maximum number of array entries (e.g., 8, pointer value "111") to the minimum array entry (e.g., 0, pointer value "000") and outputs the array entry pointer of "000" to start array entry allocation over at entry 0. Also, with defeature signal 116 equal to "0", register 405 is enabled for entry allocation to entry 0 from the "0" input port of multiplexer 405 allowing wrap-around from entry 7 to entry 0 via multiplexers 405, M0.

Alternatively, with defeaturing disabled, two entries may be allocated at the same time where the counter 120 will increment by two for this scenario. Using logic 450, 455, both banks 420, 425 (bank0, bank1) will be enabled for array entry allocation since number of valid entries signal 430 will be asserted (e.g., value of "1") and a "1" will be output from both logic 450 and logic 455 (both OR functions). For this example, two-entry allocation is to be made for entries 2 and 3. The array pointer value 135 is "010" (equal to 2) since entry 2 is the base (initial entry). The next line select signal 460 is not enabled (from bit[0]) since logic 445 outputs a "0" and array entry allocation is for a single line (line1). Line 1 is selected by bit[1] and bit[2] ("01" equaling 1). Defeaturing is disabled (defeature signal 116 equal to "0") resulting in an input of "1" to logic 440 so that subsequent entries may be allocated for entry 4 (and subsequent entries) using decoder 435 and multiplexers M4–M6. And similar to the single entry scenario, with defeature signal 116 equal to "0", register 405 is enabled for entry allocation to entry 0 from the "0" input port of multiplexer 405 allowing wrap-around from entry 7 to entry 0 via multiplexers 405, M0.

Alternatively, single entry allocation can occur with defeaturing enabled. With defeaturing enabled, defeature signal 116 is equal to "1" which disables M4 (logic 440 outputs a "0") for array entry allocation to entry 4 and subsequent entries. Wrap-around will occur from entry 3 to entry 0 as the counter 120 is reset from the defeatured number of array entries (e.g., 4, pointer value "011") to the minimum array entry (e.g., 0, pointer value "000") and outputs the array entry pointer of "000" to start array entry allocation over at entry 0. Also, with defeature signal 116 equal to "1", register 405 is enabled for entry allocation to entry 0 from the "1" input port of multiplexer 405 allowing wraparound from entry 3 to entry 0 via multiplexers 405, M0.

A single entry allocation may be performed for entry 2. The array pointer value 135 will equal "010" indicating that bank0 is selected (bit[0]). Bit[1] and bit[2] indicate that array line 1 is selected for entry allocation ("001"). Bit[1] and bit[2] are a two-bit input to decoder 435 that generates four (e.g. 1 bit) outputs indicating the line selected for entry (e.g., line 1) which is sent to each multiplexer M0–M6 in row 410. A value of "0" for bit[0] and number of valid entries signal 430 ensure that only bank0 is selected for array entry allocation using logic 450, 455 as logic 450 will output a "1" and logic 455 will output a "0". The next line select signal 460 is equal to "0" (from inputs bit[0] and number of valid entries signal 430 equaling "0") indicating that array entry allocation is on a single line (e.g., line 1). Using the logic components of architecture 400, entry 2 has been selected for array entry allocation.

Alternatively, with defeaturing enabled, two entries may be allocated at the same time where the counter 120 will increment by two for this scenario. Using logic 450, 455, both banks 420, 425 (bank0, bank1) will be enabled for array entry allocation since number of valid entries signal 430 will be asserted (e.g., value of "1") and a "1" will be output from both logic 450 and logic 455 (both OR functions). For this example, two-entry allocation is to be made for entries 1 and 2. The array pointer value 135 is "001" (equal to 1) since entry 1 is the base (initial entry). The next line select signal 460 is enabled (from bit[0] and number of valid entries signal 430) since logic 445 outputs a "1" and array entry allocation is for two separate array lines (line 0 and line 1). Line 0 is selected by bit[1] and bit[2] ("00" equaling 0) for initial array entry allocation. After entry allocation is made for entry 1, entry allocation may be made for entry 2 as the next line select signal 460 is enabled allowing the next register M2 to be selected for entry allocation to entry 2. Defeaturing is enabled (defeature signal 116 equal to "1") resulting in an input of "0" to logic 440 so that subsequent entries may not be allocated for entry 4 (and subsequent entries) using decoder 435 and multiplexers M4–M6. And similar to the single entry scenario, with defeature signal 116 equal to "1", register 405 is enabled for entry allocation to entry 0 from the "1" input port of multiplexer 405 allowing wraparound from entry 3 to entry 0 via multiplexers 405, M0.

Referring back to FIG. 1, advantageously, the software code used to program the control register (and set the global defeature bit) may be implemented using a variety of methods to accomplish "defeaturing". Firstly, the software code (patch) can be called and executed during processor system initialization (system boot up) to configure the processor system in a defeatured mode that would be included in the system BIOS.

Alternatively, the software patch could be implemented as part of an interrupt service routine where an interrupt or exception is signaled to the system when defeaturing is requested (e.g., signaled when running a pre-determined application). When the interrupt occurs, a methodology similar to that shown in FIG. 2 could be followed to initiate and complete "defeaturing". Normal program execution is halted (temporarily interrupted) and control is given to a special software routine (e.g., serializing instruction or operation). The software routine empties the array (or arrays) to be de-featured, writes to the control register to set the global defeature bit, and then returns control to the normal program which continues execution. This particular implementation may be included as part of the operating system or loaded as a driver routine, which is later called and executed to perform "defeaturing".

Advantageously, one or more arrays may be "defeatured" (reduced in size). In accordance with embodiments of the present invention, a first array to be defeatured can be an array that holds outstanding memory load or store requests and a second array to be defeatured can be an array that holds the results of each processor instruction before it is committed to an architectural state. Following the general methodology as described in FIG. 2, the software patch can first issue an instruction that allows all outstanding load/store requests to retire and prevents any further instructions from being placed in the first array. Secondly, the software patch may intentionally cause an instruction mispredict which initiates a flushing of the instructions in the second array. Thirdly, the global defeature bit may be set to lock in the sizes of these arrays to the lower (defeatured) value.

In accordance with embodiments of the present invention, there are several advantages to "defeaturing" or disabling portions of the processor array. A first advantage is that product differentiation is created as varying the size of the processor array affects processor performance as the larger array size commonly offers the best operating performance for the processor system. Therefore, a different performance operating mode for the processor is created (e.g., a lower performance or throttle-down mode) which can lead to different product lines for the manufacturer. Product differentiation can be created using subtle architecture differences without altering frequency specification for the processor system.

Additionally, power is correlated to performance so that lowering performance also lowers power consumption. Therefore, in accordance with embodiments of the present invention, dynamic power management is also provided where power consumption may be reduced dynamically (during operation of the processor) by lowering processor system performance using "defeaturing" (of array sizes).

Another advantage to embodiments of the present invention is that efficient disabling of the array during operation of the processor system is enabled which allows improved control of the architectural performance of the processor for various applications (e.g., debugging and manufacturing). To perform debugging, processor system features (e.g., array sizes) may be trimmed down (e.g., reduced or dialed down) in a step-wise manner until the behavior of a particular bug (e.g., error) is observed to change. This gradual feature reduction, enabled the present invention embodiments, facilitates isolation of faults/bugs, or working around them to provide a function processor system configuration. In an exemplary embodiment, dialing the array size down reduces the concurrency of operations in the CPU, leading to fewer corner-case pipeline behaviors and a lower probability of exercising a particular bug condition. This feature disabling (e.g., reduction) may be performed dynamically (during operation of the processor system) without having to reset or reboot the system which helps to speed up the debugging process.

Additionally, embodiments of the present invention may include a machine-readable medium having stored thereon a plurality of executable instructions, the plurality of instructions including instructions to perform the method described herein to perform feature disabling by defeaturing portions of a processor array.

Although the invention is primarily described herein using a fuse or control register example, it will be appreciated by those skilled in the art that modifications and changes may be made without departing from the spirit and scope of the present invention. As such, the method and apparatus described herein may be equally applied to any processor system that allows dynamic change of processor configuration during operation of the processor system.

What is claimed is:

1. A method for changing the configuration of a processor system, comprising:

setting a control bit in a processor system;

reducing the size of a processor array, during operation of the processor system, based on the control bit setting to produce a different performance operating mode for the processor system wherein said step of reducing includes:

performing a running count to indicate a numbered position where an entry is to be made in the array;

comparing a count of the last numbered position where an entry was made with the array size as set by the control bit; and resetting the running count when the count of the last numbered position becomes equal to the array size.

2. The method of claim 1, wherein said step of reducing includes emptying the processor array of any instructions and preventing entry of any further instructions.

3. The method of claim 1, wherein the processor array is an array containing outstanding requests, and said step of reducing includes allowing the outstanding requests to retire, and preventing any further requests to be placed in the array.

4. The method of claim 1, wherein the processor array is an array containing the results of processor instructions, and said step of reducing includes emptying the array of the results.

5. The method of claim 1, wherein said step of setting includes setting the control bit using a bit value produced from programming a control register.

6. The method of claim 1, wherein said step of reducing includes reducing the size of the array using a logic circuit where a portion of the logic circuit is disabled based on the control bit setting.

7. A method for changing the configuration of a processor system, comprising:

setting a control bit in a processor system;

reducing the size of a processor array based on the control bit setting to produce a different performance operating mode for the processor system;

performing a running count to indicate a numbered position where an entry is to be made in the array;

comparing a count of the last numbered position where an entry was made with the array size as set by the control bit; and resetting the running count when the count of the last numbered position becomes equal to the array size;

wherein said step of setting includes setting the control bit using a bit value produced from programming a fuse.

8. A machine-readable medium having stored thereon a plurality of executable instructions, the plurality of instructions comprising instructions to:

set a control bit in a processor system; reduce the size of a processor array, during operation of the processor system, based on the control bit setting to produce a different performance operating mode for the processor system wherein said instructions to reduce include instructions to:

perform a running count to indicate a numbered position where an entry is to be made in the array;

compare a count of the last numbered position where an entry was made with the array size as set by the control bit; and reset the running count when the count of the last numbered position becomes equal to the array size.

9. The medium of claim 8, wherein said instructions to reduce include instructions to empty the processor array of any instructions and preventing entry of any further instructions.

10. The medium of claim 8, wherein the processor array is an array containing outstanding requests, and said instructions to reduce include instructions to allow the outstanding requests to retire, and prevent any further requests to be placed in the array.

11. The medium of claim 8, wherein the processor array is an array containing the results of processor instructions, and said instructions to reduce include instructions to empty the array of the results.

12. The medium of claim 8, wherein said instructions to set include instructions to set the control bit using a bit value produced from programming a fuse.

13. The medium of claim 8, wherein said instructions to set include instructions to set the control bit using a bit value produced from programming a control register.

14. The medium of claim 8, wherein said instructions to reduce include instructions to reduce the size of the array using a logic circuit where a portion of the logic circuit is disabled based on the control bit setting.

15. An apparatus for changing the configuration for a processor system, comprising:

a control logic circuit, programmable to set a control bit to reduce the size of a processor array during operation of the processor system to produce a different performance operating mode for the processor system;

a counter to perform a running count to indicate a numbered position where an entry is to be made in the array;

a comparator, intercoupled to the counter, to compare a count of the last numbered position where an entry was made with the array size as set by the control bit; and wherein the counter resets the running count when the count of the last numbered position becomes equal to the array size.

16. The method of claim 15, wherein said control logic circuit is programmable to empty the processor array of any instructions and prevent entry of any further instructions.

17. The method of claim 15, wherein the processor array is an array containing outstanding requests, and said control logic circuit is programmable to allow the outstanding requests to retire, and prevent any further requests to be placed in the array.

18. The apparatus of claim 15, wherein the processor array is an array containing the results of processor instructions, and the control logic circuit is programmable to empty the array of the results.

19. The apparatus of claim 15, wherein the control logic circuit is a fuse.

20. The apparatus of claim 15, wherein the control logic circuit is a control register.

21. The apparatus of claim 1, further comprising:

an array logic circuit, intercoupled to the control circuit logic circuit and array, and programmable to reduce the size of the array, where a portion of the array logic circuit is disabled based on the control bit setting.

* * * * *